Nov. 23, 1965
G. H. DALE
3,218,818
FRACTIONAL CRYSTALLIZATION CONTROL SYSTEM
Filed April 1, 1963
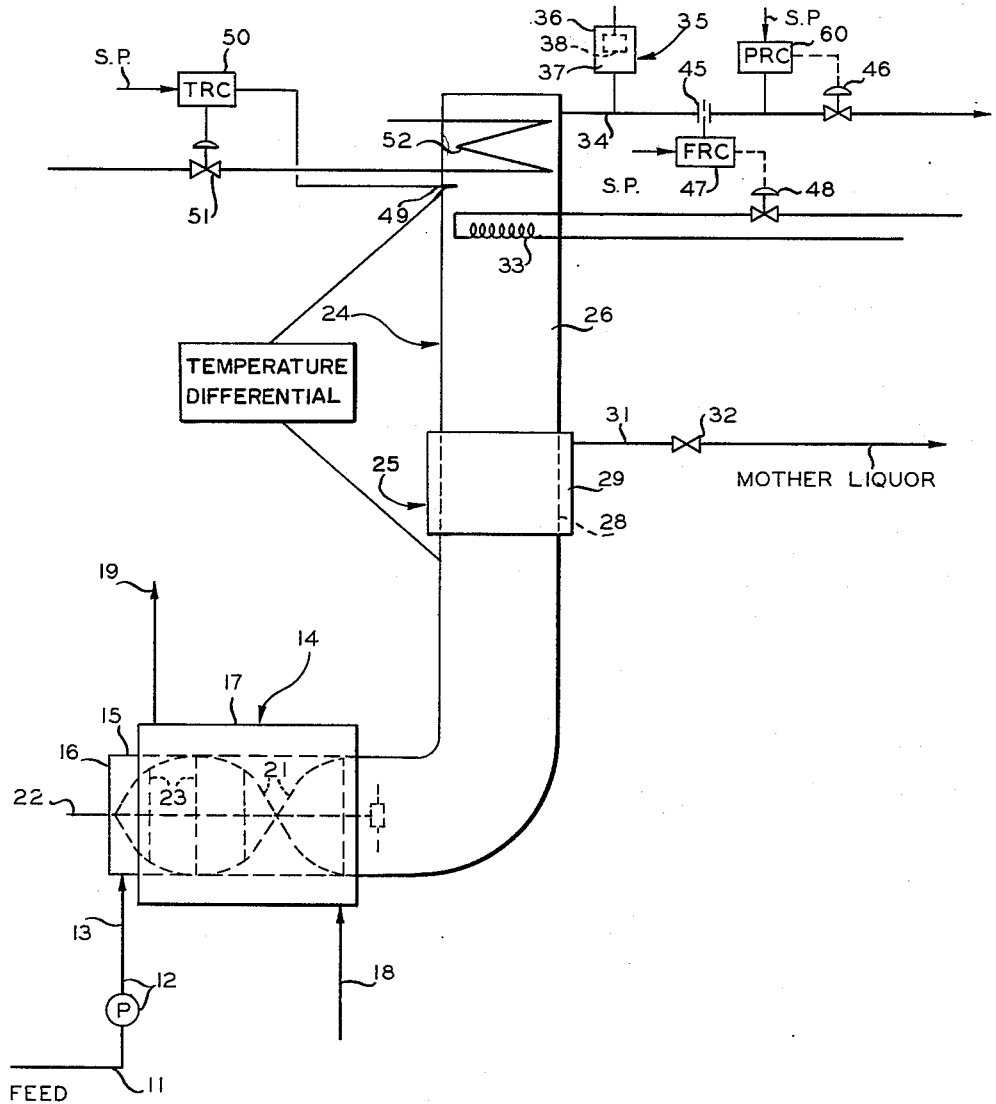
INVENTOR.
GLENN H. DALE
BY *Young and Quigg*
ATTORNEYS

United States Patent Office 3,218,818
Patented Nov. 23, 1965

3,218,818
FRACTIONAL CRYSTALLIZATION
CONTROL SYSTEM
Glenn H. Dale, Bartlesville, Okla., assignor to Phillips Petroleum Company, a corporation of Delaware
Filed Apr. 1, 1963, Ser. No. 269,260
7 Claims. (Cl. 62—58)

This invention relates to a method and apparatus for separating the components of a liquid mixture by means of fractional crystallization. In one aspect the invention relates to a method and apparatus for the purification of crystals. In another aspect the invention relates to a method for the purification of crystals and the rate of melting thereof.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of paraxylene from a mixture thereof with the other xylene isomers and ethyl benzene.

Previously the crystals have been melted by the application of heat to the melting section of the purification column by means of a suitable heating element, such as a heat exchange coil or an electrical heater, disposed inside the melting section and in contact with the melt or disposed outside the melting section and in heat exchanging relationship therewith, or by means for effecting direct heat exchange between a suitable fluid, such as warm butane, and the contents of the melting section. In general the prior art systems maintained the rate of introduction of heat into the melting section at a substantially constant value and permitted the purified product withdrawal rate to vary. However, in order to obtain and maintain optimum production of purified product it has become desirable to withdraw the purified product at a substantially constant rate. Difficulties have been encountered in maintaining the desired constant withdrawal rate of purified product due to various fluctuations within the system such as channeling of melt liquid through a void in the crystal bed.

It is an object of the invention to provide an improved method and apparatus for effecting the separation of components of a mixture.

It is another object of the invention to provide a method and means for the fractional crystallization and purification of said crystals of a multi-component mixture.

Still a further object of the invention is to provide a method and means for purifying crystals.

Still another object of the invention is to provide a method and means for controlling the temperature of the melt being refluxed into a bed of crystals.

These and other objects, aspects and advantages of the invention will be apparent from a study of the disclosure, drawing and appended claims.

These objects are broadly accomplished in a process wherein a body of solids is moved into a solids melting zone, solids are melted in said zone with part of the melt being removed from the system and another part being forced in the direction countercurrent to the direction of movement of said solids by the improvement comprising controlling the rate of melt removed from said zone by varying the amount of solids being melted and controlling the temperature of said melt to provide a substantially constant temperature of melt being forced into the body of solids.

In another aspect of the invention a system of two heaters is provided in the melt section of the crystal purification column with one heater being adjusted to control the rate of crystals being melted and the other heater being adjusted to control the temperature of the melt being refluxed into the bed of crystals.

The invention will be described with primary reference to a pulse-type crystal purification column employing a chiller directly connected thereto but the invention is not to be so limited. The invention is also applicable to the employment of any type of purification column which refluxes a melt against a bed of solids and to any type of chilling means for the crystallization of the multi-component mixture.

Referring now to the figure in the drawing in detail, a feed mixture comprising two or more components, one of which is separable from the mixture by crystallization, is passed through conduit 11 and is forced by means of pump 12 through conduit 13 into chilling section 14. Chilling section 14 comprises an inner cylindrical shell 15 one end of which is closed by means of an end member 16, and a cooling jacket 17 having an inlet 18 and an outlet 19. Agitating or scraping means 21 are positioned within cylindrical shell 15 and are designed to prevent the accumulation of solid material on the inner surface of cylindrical shell 15. Scraping means 21 can be constructed of strips of metal or other suitable material known in the art and can be fabricated in the form of a helix, as shown in the drawing, or can be straight. Any suitable form of scraping means 21 can be provided. Scraping means 21 are mounted on a rotatable shaft 22 by means of members 23. Shaft 22 is axially positioned within cylindrical shell 15 and is connected to any suitable source of power which rotates the scraping means, such power source not being shown in the drawing. Shaft 22 is suitably sealed in end member 16 by means of a packing gland of any desired type known in the art. Cooling of the feed which enters chilling section 14 can be provided by passing a suitable coolant through inlet 18 and withdrawing the coolant through outlet 19. Sufficient cooling in chilling section 14 is provided so that a predetermined amount of solid crystals is produced from the feed passing therethrough. The resulting slurry of crystals in mother liquor is passed into purification column 24 which comprises filtration section 25, reflux section 26, and melting section 27. Filtration section 25 comprises a suitable filter screen or medium 28 and an external shell 29, the latter being provided with an outlet pipe 31 through which the filtrate, that is, the mother liquor is passed. Filter medium 28 can be of any desired type known in the art. For example, it can comprise a metallic screen, a sintered perforate metal member or a perforate metal member supporting a filter cloth. It is desirable that the filter member 28 be positioned integrally with respect to adjacent walls of reflux section 26. Although filtration section 25 has been illustrated in the drawing as being an external filter, it is within the scope of the invention to utilize an internal filter, in which event, external shell 29 could be positioned integrally with respect to the wall of reflux section 26, and filter medium 28 would be disposed within shell 29 and preferably positioned axially with respect to purification column 24. The filtrate produced in filtration section 25 is removed from purification column 24 through conduit 31. Conduit 31 can contain a suitable means, such as pressure reducing valve 32, to maintain a predetermined back pressure. The remaining crystal mass is passed into reflux section 26 wherein it is countercurrently contacted with liquid reflux as subsequently described. As the crystal mass approaches heating element 33 in melting section 27, the crystals are melted. A portion of the melt produced by the heat from heating element 33 is withdrawn through product withdrawal conduit 34. In many cases this would be the purified product of the process although in such cases where it is desired to merely concentrate a mixture such as an alcoholic beverage the actual product would normally be considered to be the mother liquor. The remainder of the melt is forced back through reflux section 26 to form reflux which effects crystal purification.

The pulsation-producing means 35 comprises a cylinder 36, one end of which is in fluid communication with the purified product withdrawal line 34, and reciprocable piston 37 mounted within cylinder 36. Piston 37 is suitably sealed in cylinder 36, for example by means of rings 38, to prevent leakage of the purified product. Reciprocation of piston 37 is produced by any suitable means. While the crystal mass is being advanced from chilling section 14 through filtration section 25 and reflux section 26 into melting section 27, piston 37 is reciprocated at a suitable rate, such as in the range of about 50 to about 400 pulsations per minute, so that a pulsating pressure is exerted on the melt reflux which is intermittently forced back, countercurrently with respect to the crystal mass into reflux section 26. The rate of withdrawal of the liquid through conduit 34 is maintained substantially constant by adjusting or varying the amount of heat applied to the bed of crystals through heater element 33. In the embodiment shown in the drawing a flow sensing means such as an orifice plate 45 is disposed in conduit 34 and a signal proportional to the rate of flow of the liquid is transmitted to a flow recorder controller 47 which contains a predetermined set point. When the signal indicates the set point has been exceeded a signal is sent to valve 48 to adjust the amount of heat exchange fluid passing through heating element 33. Although the drawing employs a heat exchange fluid for the heating element 33 it is obvious that any type of heat exchange means may be employed such as an electrical device or heating element with appropriate control device. Pressure controller 60 manipulates valve 46 in response to the pressure of the liquid melt, thus maintaining the liquid product under a constant pressure.

It has now been discovered that it is most advantageous to control the rate of crystals being melted and thus the product withdrawal rate independently of the control of the temperature of the melt refluxed into the solids. It is most important to control the temperature of the reflux in order to control the refreezing of the melt as it contacts the cold solids. As the warm high-purity reflux liquid contacts the cold crystals, part of the reflux liquid freezes and part of the impure crystals melt as dictated by heat balance and equilibrium relationships. It is necessary to refreeze a rather critical amount of the reflux in order to obtain a desired degree of crystal purification. Other factors being constant, the warmer the reflux liquid, the smaller the amount that refreezes and vice versa. Sufficient reflux liquid must be refrozen to entirely fill the void spaces and crystal interstices and thus displace the mother liquor impurities. The amount that must be refrozen thus depends upon the crystal size and shape.

It is important that conditions do not permit more reflux to refreeze than the void spaces and crystal interstices can accommodate. When such conditions occur, a channel will be melted in the crystal bed and purification efficiency is greatly decreased. Control of the reflux melt temperature thus permits control of refreezing and hence control of the degree of crystal purification. In the embodiment shown in the drawing a heating element 52 is positioned in the melt section of the crystal purification column downstream of the first heating element. Although a heating element is shown in this drawing it is believed obvious that it may be desirable in some instances to provide a heat exchange means which permits cooling of the fluid or melt. A temperature sensing means 49 is disposed in the melt section, preferably in the melt actually being refluxed in the crystal bed although the position is not necessarily that shown in the drawing. A signal proportional to the temperature of the melt is then transmitted to a temperature recorder controller 50 which has a predetermined set point. When this predetermined set point has been exceeded a signal is transmitted to valve 51 to adjust accordingly the amount of heat exchange fluid being passed through heat exchange means 52.

Preferably the temperature of the melt being refluxed into the solids bed will be adjusted to a constant temperature differential above the temperature of the slurry of solids being fed into the filtration zone 25. This temperature differential will necessarily be different for each material or multi-component mixture being resolved and will differ according to the product purity desired. For example, for the concentration of beer the temperature of the melt being refluxed is generally in the range of 60 to 65° F.

The invention is broadly applicable to the resolution of any multi-component mixture which is resolvable by fractional crystallization. Preferably the invention is applicable to the production of materials such as the separation of paraxylene from mixtures thereof and other xylene isomers and ethyl benzene and other non-aqueous mixtures. The invention is also applicable to the production of fresh water from brine and to the concentration of aqueous solutions, examples of which include fruit juices, vegetable juices and alcoholic beverages.

The invention is illustrated by the following example.

*Example*

The amount of refreezing is calculated by the following heat balance equation:

$$\frac{100 Cp_s(T_p - T_s)}{\Delta H_f + Cp_L(T_M - T_p)}$$

where $R$ = refreezing ratio lb. of reflux liquid frozen per 100 lb. of crystals entering the column
$Cp_s$ = average specific heat of crystals, B.t.u./(lb.)(° F.)
$T_p$ = product melting point, ° F.
$T_s$ = temperature of crystals entering column, ° F.
$T_m$ = temperature of reflux liquid, ° F.
$\Delta H_f$ = latent heat of fusion of melt, B.t.u./lb.
$Cp_L$ = average specific heat of liquid, B.t.u./(lb.)(° F.)

In the purification of p-xylene, a xylene feedstock containing 65.0 weight percent p-xylene, the remainder being o-xylene and m-xylene, is fed to chiller 14 at the rate of 200 pounds per hour. The feed is cooled to 0° F. in the chiller thereby producing a slurry containing 40 weight percent p-xylene crystals.

The crystal slurry is passed into purification column 24 and mother liquor is removed through filter 31 at the rate of 160 pounds per hour. Sufficient heat is applied to heater 33 to melt the 40 pounds per hour of xylene crystals and 40 pounds of xylene product is withdrawn through product line 34. Without the invention, i.e., with no heat applied to heater 52, temperature of the reflux liquid in the base of the column is found to be 76° F. The amount of refreezing of reflux liquid is calculated to be $$R = \frac{100(0.50)(56-0)}{70.7 + 0.4(76-56)}$$

where 0.50=specific heat of p-xylene crystals
0.40=specific heat of p-xylene liquid
56=melting point of p-xylene, ° F.
0=slurry temperature, ° F.
76=reflux temperature, ° F.
70.7=heat of fusion of p-xylene, B.t.u./lb.
$R$=35.6 lb. of reflux refrozen per 100 lb. of crystal feed.

Performance of the column is poor under the above conditions since too much reflux is being refrozen for optimum operation and p-xylene product purity is low.

Heat is now applied to heater 52 until the reflux temperature is 176° F. Amount of reflux refrozen is now $$R = \frac{100(0.50)[56-0]}{70.7 + 0.4[56-56]}$$

$R$=25.3 lb. of reflux refrozen per 100 lbs. of crystal feed.

At this reduced amount of refreezing, column performance is found to be an optimum. p-Xylene product purity rises to 99+ percent. Column throughout also rises to a maximum.

While certain examples, structures, composition and process steps have been described for purposes of illustration, the invention is not limited to these. Variation and modification within the scope of the disclosure and the claims can readily be effected by those skilled in the art.

I claim:

1. In a process wherein a body of solids is moved into a first heat exchange zone, solids are melted in said zone with part of the melt being removed from the system and another part being forced in a direction countercurrent to the direction of movement of said solids the improvement comprising controlling the rate of melt removed from said zone by varying the amount of solids being melted, passing said melt to a second heat exchange zone, and controlling the temperature of said melt in said second heat exchange zone to provide a substantially constant temperature of melt being forced into the body of solids.

2. In a process which comprises passing a slurry of crystals in mother liquor into a filter zone, withdrawing mother liquor from said filter zone, moving the resulting mass of crystals into a reflux zone, moving said crystal mass through said reflux zone into a first heat exchange zone wherein said crystals are melted, passing a portion of the resulting melt countercurrently to the direction of movement of crystals in said reflux zone, removing the remainder of the melt, the improvement which comprises measuring the amount of melt being removed and adjusting directly the amount of heat applied to said crystals in said first heat exchange zone responsive to said amount of melt being removed to provide a substantially constant rate of melt removed, heating the melt within said first heat exchange zone, passing said melt to a second heat exchange zone, therein measuring the temperature of said melt and adjusting the amount of heat applied to said melt in said second heat exchange zone to provide a substantially constant temperature of melt being refluxed into said crystals.

3. A process for separating a component from a multicomponent mixture resolvable by crystallization which comprises introducing said mixture into a cooling zone and cooling said mixture to crystallize at least a portion of one of the components of said mixture, passing the resulting slurry of crystals in mother liquor into a stationary filtering zone, withdrawing mother liquor from said filtering zone, passing the resulting crystal mass from said filtering zone through a reflux zone and into a melting zone comprising a first heat exchange zone and a second heat exchange zone, melting said crystals in said first heat exchange zone by the application of heat to said crystals, withdrawing a portion of the resulting melt from said melting zone, measuring the rate at which melt is removed and adjusting directly the amount of heat applied to said crystals responsive to said rate at which melt is removed so as to provide a substantially constant amount of melt being removed, passing the remainder of the melt into said reflux zone in a direction countercurrent to the movement of crystals therethrough, applying an intermittent pressure to the melt in said melting zone, applying heat to the melt in said second heat exchange zone, measuring the temperature of the melt in said melting zone, and adjusting the amount of heat applied to said melt in said second heat exchange zone responsive to said temperature measurement to provide a substantially constant temperature melt for refluxing the crystals.

4. The process of claim 3 wherein said melt temperature is maintained at a substantially constant differential above the temperature of the slurry entering the filtering zone.

5. In a crystal purification apparatus comprising a purification chamber, a first heat exchange means positioned within one end of said purificaiton chamber for melting solids, melt withdrawal means connected to said end of said purification chamber, and means to move solids through said purification chamber toward said first heat exchange means, the improvement comprising flow sensing means disposed in said melt withdrawal means, a flow recorder control means operatively connected to said flow sensing means and said first heat exchange means to adjust directly the amount of heat applied to said crystals responsive to the rate at which melt is removed, a second heat exchange means positioned downstream of said first heat exchange means, a temperature sensing means disposed downstream of said first heat exchange means and a temperature sensing means operatively connected to said temperature control means and said second heat exchange means.

6. In a crystal purification apparatus which comprises a cooling chamber, means for cooling said cooling chamber, a purification chamber in open communication with said cooling chamber, inlet means to said cooling chamber opposite said purification chamber, stationary filtration means positioned in said purification chamber, liquid outlet means connected to said filtration means, a first heat exchange means positioned in the end portion of said purification chamber opposite said cooling chamber, melt withdrawal means connected to said end of said purification chamber, means for propelling solids from said cooling chamber through said purification chamber toward said melting means, means for producing an intermittent back-pressure in said purification chamber, the improvement comprising flow sensing means disposed in said melt withdrawal means, a flow recorder control means operatively connected to said flow sensing means and said first heat exchange means to adjust directly the amount of heat applied to said crystals responsive to the rate at which melt is removed, a second heat exchange means positioned in said end downstream of said first heat exchange means, said second heat exchange means positioned downstream of said melting means, a temperature sensing means disposed downstream of said first heat exchange means and a temperature control means operatively connected to said temperature sensing means and said second heat exchange means.

7. The apparatus of claim 6 wherein said second heat exchange means comprises a heating means.

References Cited by the Examiner

UNITED STATES PATENTS 2,683,178   7/1954   Findlay.
2,854,494   9/1958   Thomas.
2,894,997   7/1959   Hachmuth.
2,981,773   4/1961   Weedman.

NORMAN YUDKOFF, *Primary Examiner.*